Dec. 28, 1926.
J. W. JEPSON
1,612,377
INTERNAL COMBUSTION ENGINE
Filed March 17, 1922
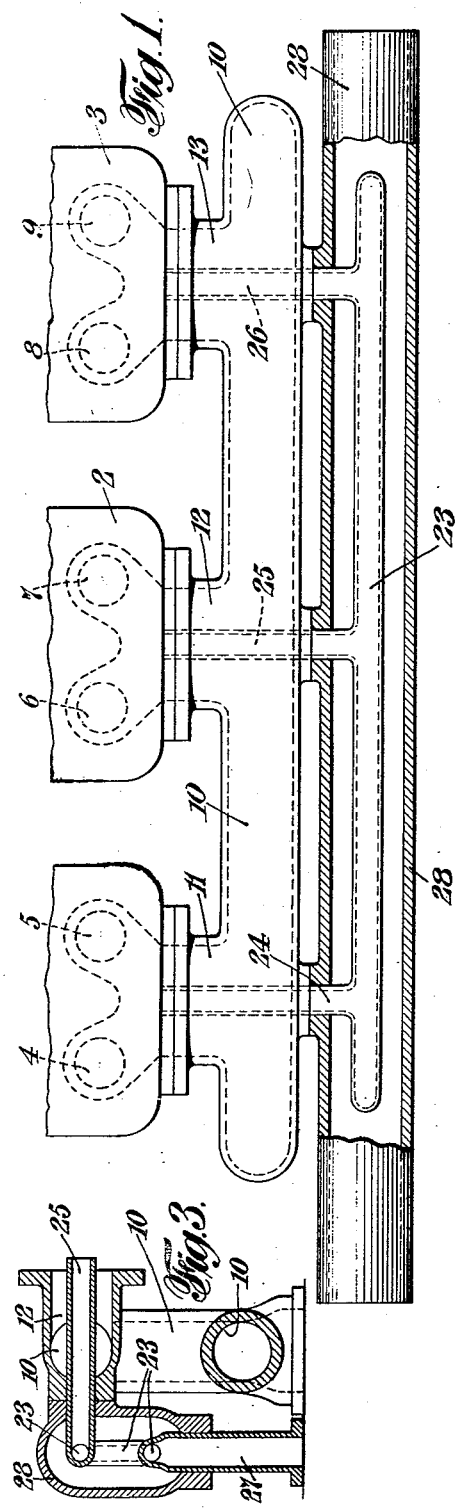
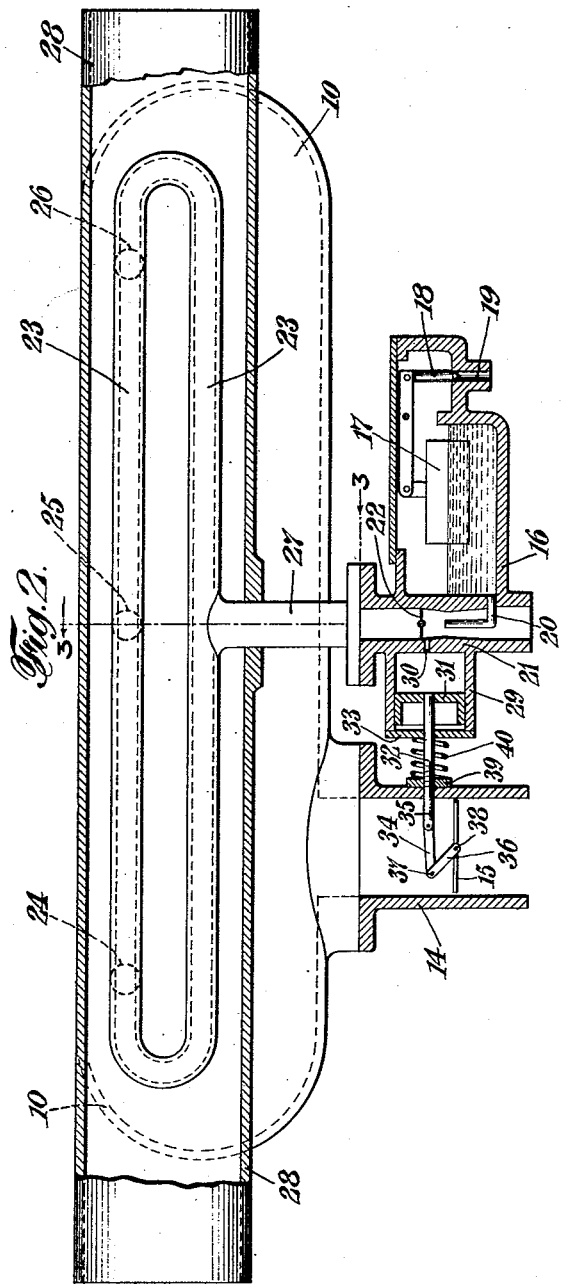
John W. Jepson
INVENTOR
BY Ward, Crosby & Smith
ATTORNEYS Patented Dec. 28, 1926.

1,612,377

UNITED STATES PATENT OFFICE.

JOHN W. JEPSON, OF ELIZABETH, NEW JERSEY.

INTERNAL-COMBUSTION ENGINE.

Application filed March 17, 1922. Serial No. 544,439.

My invention relates to improvements in internal combustion engines and more particularly to improvements relating to the carburation or mixture of fuel with the air and the heating of the fuel used in the engine. One object of the invention is to provide an arrangement of the class described in which gasoline or other fuel, and the air to be admixed therewith is so regulated as to obtain greater volumetric efficiency. A further object is to obtain the proper ratio of air to fuel under variable conditions and obtain greater economy generally. Further and more specific objects, features and advantages will more clearly appear from the detail description given below taken in connection with the accompanying drawings which form a part of this specification.
In the drawings, Fig. 1 is a plan view of certain internal combustion engine parts embodying the improvements in one form and showing a part of the exhaust pipe in section. Fig. 2 is a vertical section through such exhaust pipe and also showing the carburetor parts in vertical section but in a plane at an angle to the plane of the section of the exhaust pipe. Fig. 3 is a section taken on the line 3—3 of Fig. 2.
Referring to the drawings, 1, 2, and 3 represent parts of engines cylinder blocks of a six-cylinder internal combustion engine adapted to use gasoline or similar volatile fuel. Each part 1, 2 and 3 is provided with intake openings 4, 5, and 6, 7, and 8, 9, leading to the respective engine cylinders and through which the mixed vaporized fuel and air are conducted to the engine cylinders in a manner well understood by those skilled in the art. Rigidly connected to the parts 1, 2 and 3 is an air intake manifold 10. The air intake manifold 10 comprises a pipe in the form of a closed loop having outlet passages at 11, 12 and 13 on the top side of said loop and connecting with the passages 4, 5, and 6, 7, and 8, 9, respectively. The other and lower side of the loop 10 is provided with an air intake at 14 having therein a butterfly valve 15 for regulating the amount of air introduced into the air intake manifold 10, in a manner to be more particularly described hereinafter. 16 represents a carburetor of any well known or suitable variety provided with a suitable float 17 controlling an inlet valve 18 for regulating the admission of gasoline or other fuel into the carburetor 16 through the inlet passage 19. The carburetor is provided with a suitable nozzle 20 in the Venturi tube 21 which contains above the nozzle 20 a suitable butterfly valve 22 adapted to be operated manually or otherwise in order to control the amount of fuel introduced.

23 represents a fuel intake manifold also constructed of a pipe in the form of a closed loop, the upper side of which is provided with pipe sections 24, 25 and 26 forming passages from the upper side of the fuel intake manifold 23 leading directly through the upper side of the air intake manifold 10 and into the passages 11, 12 and 13 respectively so that fuel introduced through the fuel intake manifold 23 is conducted substantially to the engine cylinders before being mixed with the air which is introduced through the air intake manifold 10. The fuel intake manifold 23 has the lower side of its loop connected with the carburetor venturi by means of pipe 27. 28 represents a part of the exhaust pipe of the engine, one end of which may be connected to the engine exhaust in any suitable or well known manner and the other end of which may lead to the usual muffler for the exhaust gases, if desired. The entire fuel intake manifold loop 23 is contained within the exhaust pipe 28 so that the fuel introduced through the manifold 23 is heated by the exhaust gases passing through the exhaust pipe 28. 29 represents a small cylinder connected with the space in the venturi below the valve 22 and above the Venturi nozzle 20 by a small passageway 30. The cylinder 29 is provided with a piston 31 and a piston rod 32 sliding through a plate 33 fixed on the end of cylinder 29. The piston rod 32 has its outer end pivoted to a link 34 at 35 and the link 34 is pivoted to an arm 36 at 37, which arm is rigidly connected to the valve 15, both being pivoted at 38. The piston rod 32 is provided with a disk 39 screw-threaded thereon and between the disk 39 and cap plate 33 is arranged a spiral spring 40 whereby the spring 40 tends to force the piston rod 32 with piston 31 to the left as viewed in Fig. 2 and operate the link and lever arm 34, 36 to move or maintain the valve 15 normally in position shown in Fig. 2 whereby the air intake is substantially closed.

In operation when the engine is running, suction is produced in the respective manifolds in a manner well understood by those skilled in the art whereupon the gasoline or other fuel from the carburetor is more or less vaporized and atomized in the tube 21 and sucked up through the fuel intake manifold 23 and around the same and out through the members 24, 25 and 26 to the various cylinders as desired. Some air will be drawn in through the lower open end of the Venturi tube 21 along with this fuel as it is desirable that a certain amount of air be introduced with the fuel in order to secure proper vaporization or atomization of the fuel in the venturi 21 and fuel intake manifold. The amount of fuel introduced is regulated as desired by the butterfly control valve 22. The more the butterfly control valve 22 is opened thereby increasing the suction upon the Venturi nozzle 20 and increasing the amount of fuel withdrawn therefrom, the greater will be the suction or exhaust through the passage 30 and on the piston 31 so that as the valve 22 is operated to increase the amount of fuel introduced into the fuel intake manifold, the piston 31 is moved to the right as viewed in Fig. 2 against the action of spring 40 thereby opening the valve 15 whereby the amount of air introduced into the air intake manifold through the air intake 14 is increased responsive to the variations in the amount of fuel atomized and used and the amount of air introduced into the cylinders with the vaporized fuel is varied in accordance with the amount of fuel introduced from the carburetor.

It will be understood that the greater proportion of the air to be introduced into the cylinders or the engine goes in through the air intake 14 and air intake manifold 10 and only a small proportion goes in with the fuel through the tube 21. In this way the bulk of the air introduced reaches the cylinders relatively cool whereas the fuel introduced reaches the cylinders in a relatively hot condition having been heated on its way from the fuel vaporizer to the cylinders by the exhaust gases in exhaust pipe 28. The bulk of the air which is introduced is not so heated and is relatively cool and less rarified when it goes into the engine cylinders and hence a larger amount of air and oxygen may be introduced into the cylinders.

It will also be noted that the cross-sectional area of the fuel intake manifold 23 is very small as compared with the cross sectional area of the air intake manifold 10 whereby not only may the greater portion of the air be readily and easily introduced through the air intake manifold substantially to the cylinders before being mixed with the fuel, but the small cross sectional area of the fuel intake manifold 23 greatly increases the velocity of the vaporized fuel passing therethrough and this prevents or minimizes the condensation of fuel on the walls of the manifold whereby substantially all the fuel is conducted directly into the cylinders in a highly vaporized condition. The heating of the fuel manifold, of course, also tends to maintain the fuel introduced therethrough in a highly vaporized condition, all to the end that the fuel when it reaches the cylinders will not be so likely to condense and flow down around the pistons and work into the crank case where it may dilute the oil therein. Also by having the fuel introduced in this heated and highly vaporized condition substantially independent of the air, a more powerful explosive charge is obtained.

It is well known that in the ordinary type of apparatus, when the accelerator valve is quickly opened wide in order to obtain rapid acceleration, the power of the engine frequently suddenly decreases and indeed the engine may go dead or stall. This I believe is due to the fact that in the ordinary type of apparatus when the valve 22 is suddenly opened, the air being relatively light as compared with the fuel introduced, rushes through the usual manifold ahead of the fuel so that the mixture for a moment being introduced into the cylinders contains an excessive amount of air which may be so great as to form a non-explosive mixture and so cause the engine to practically stop. In the arrangement above described this is prevented because when the valve 22 is suddenly opened wide in order to accelerate the engine, the desired increased amount of fuel is drawn from the carburetor through the fuel manifold and the valve 15 does not open simultaneously with the valve 22, but lags behind because it takes a short time for the increased suction produced in the venturi 21 to have its effect on the piston 31 and compress the spring 40 and open the valve 15. Therefore, the increase in air introduced through the intake manifold lags behind the fuel introduced through the fuel manifold so that the increased amount of fuel reaches the cylinders substantially simultaneously with the increased amount of air thereby substantially maintaining a properly proportioned fuel charge.

By having the fuel manifold arranged in the form of a loop with passages leading from one side of the loop to the cylinders and a passage leading from the other side of the loop to the fuel vaporizer, then no matter which cylinder or cylinders are acting to draw fuel from the manifold, the fuel drawn will pass partly around one end of the loop of the fuel manifold 23 and partly around the other end thereof so that at all times during the operation of the engine the fuel vaporized will be passing around and along all parts of the manifold loop whereby if there is any tendency for the condensation or settling out of fuel on the walls of the manifold, such fuel will be swept along and carried to the cylinders in a substantially vaporized condition. There are no parts of the manifold loop which have so-called "dead" spaces at any time; that is, no spaces where momentarily the flow of gases is discontinued. The fuel is delivered uniformly to all cylinders. Any other suitable means may be provided for operating the air intake valve 15 responsive to or in proportion to the amount of fuel being introduced from the carburetor or fuel vaporizer. By forming the air intake manifold 10 in the form of a similar loop, each cylinder pulls on the whole circuit around the loop, that is around both ends so that the air from the intake 14 reaches one cylinder substantially as quickly as another.

By placing the fuel intake manifold where it is heated by the exhaust and so heating the greater portion of the fuel to be finally mixed with the air, the fuel is brought quickly to the desired temperature while the most of the air introduced being not so heated is not rarified and these two, the heated vaporized fuel and the relatively cool air are not mixed until they are about to enter the engine cylinders whereby a greater amount of energy is obtained from each charge and the fuel more economically used.

While I have described by improvements in great detail and with respect to a preferred form thereof I do not desire to be limited to such details since many changes and modifications may be made and the improvements embodied in widely different forms without departing from the spirit and scope of the invention in its broader aspects. Indeed various features of my invention may be used without using others.

What I claim as new and desire to secure by Letters Patent is:

1. An internal combustion engine having a fuel vaporizer, means for conducting the fuel vaporized thereby to the engine cylinders, a separate air intake, and means for regulating the amount of air through said air intake responsive to variations in pressure in the vaporized fuel.

2. An internal combustion engine having a fuel vaporizer, means conducting the fuel vaporized thereby to the engine cylinders, an air intake through which air may pass to the cylinders without passing through the fuel vaporizer, and means dependent upon the amount of fuel vaporized for varying the amount of air admitted through the said air intake, said means comprising a spring pressed piston operated by variations in pressure in the fuel vaporizer and controlling the operation of a valve in the air intake.

3. An internal combustion engine having a carburetor by means of which some air is mixed with the fuel to vaporize or atomize the fuel, means for manually varying the amount of fuel so vaporized or atomized by the carburetor, means for conducting such fuel to the engine cylinder or cylinders, a separate air intake, means for conducting the major portion of the air to be burned with said fuel from said intake and substantially to the engine cylinder or cylinders before being mixed with said fuel and means automatically varying the amount of air admitted through the air intake responsive to conditions in said carburetor.

4. An internal combustion engine having a carburetor by means of which some air is mixed with the fuel to vaporize or atomize the fuel, means for manually varying the amount of fuel so vaporized or atomized by the carburetor, means for conducting such fuel to the engine cylinder or cylinders, a separate air intake, means for conducting the major portion of the air to be burned with said fuel from said intake and substantially to the engine cylinder or cylinders before being mixed with said fuel, means automatically varying the amount of air admitted through the air intake responsive to variations in the amount of fuel leaving the carburetor, and means whereby said fuel is heated on its way from the carburetor to the cylinder or cylinders by the engine exhaust.

5. An internal combustion engine having a plurality of cylinders, an air intake, and a manifold through which the air passes from the intake to the cylinders, said manifold being in the form of closed loop, with passages from one side of the loop to the cylinders and a passage from the other side of the loop to the intake, a fuel carburetor and a manifold receiving atomized fuel from said carburetor, said fuel manifold being in the form of a closed loop, with passages from the side of the loop to the cylinders and a passage from the other side of the loop to the fuel carburetor.

6. An internal combustion engine having a plurality of cylinders, an air intake manifold with passages leading to said cylinders, a fuel carburetor and a manifold receiving atomized fuel from said carburetor, said fuel manifold being in the form of a closed loop with passages from one side of the loop to the cylinders and a passage from the other side of the loop to the fuel carburetor and means for heating the vaporized fuel from the engine exhaust without so heating the air from the air intake manifold.

7. An internal combustion engine having a plurality of cylinders, an air intake manifold with passages leading to said cylinders, a fuel carburetor and a manifold receiving atomized fuel from said carburetor, said fuel manifold being in the form of a closed loop, with passages from one side of the loop to the cylinders and a passage from the other side of the loop to the fuel carburetor and said loop lying in the engine exhaust whereby the vaporized fuel is heated thereby without so heating the air from the air intake manifold.

8. An internal combustion engine having a plurality of cylinders, an air intake manifold with passages leading to the cylinders, a fuel carburetor and a manifold receiving the atomized fuel from said carburetor, said fuel manifold being in the form of a closed loop with passages from one side of the loop to the cylinders and a passage from the other side of the loop to the fuel carburetor, said fuel intake manifold having a cross-section substantially less than that of the air intake manifold whereby the velocity of the ingoing atomized fuel is relatively increased.

9. An internal combustion engine having a fuel carburetor, means for conducting the fuel atomized thereby to the engine cylinders, a separate air intake through which the greater part of the air is conducted to the cylinders, and means for varying the amount of air admitted through the air intake responsive to variations in the amount of fuel leaving the carburetor.

10. An internal combustion engine having a fuel carburetor, an air intake and means conducting vaporized fuel from the carburetor substantially to the engine cylinder before being mixed with the air from said intake and means for varying the amount of air admitted through the air intake responsive to variations in the amount of fuel vaporized by the carburetor.

11. An internal combustion engine having a fuel carburetor, an air intake, means conducting the vaporized fuel from the carburetor to the engine cylinder or cylinders, means whereby the said vaporized fuel is heated on its way to the engine cylinder or cylinders and means whereby air from said intake is conducted to said cylinder or cylinders without being so heated and means for varying the amount of air admitted through the air intake responsive to the amount of vaporized fuel introduced from the fuel carburetor.

12. An internal combustion engine having a plurality of cylinders, a fuel carburetor and a fuel intake manifold, said fuel manifold being in the form of a closed loop with passages from one side of the loop to the cylinders and a passage from the other side of the loop to the fuel carburetor and means varying the amount of air admitted through the air intake responsive to variations in the amount of fuel vaporized by the fuel carburetor.

13. An internal combustion engine having a plurality of cylinders, an air intake manifold with passages leading to said cylinders, a fuel carburetor and a fuel intake manifold, said fuel manifold being in the form of a closed loop with passages from one side of the loop to the cylinders and a passage from the other side of the loop to the fuel carburetor and means for heating the atomized fuel from the carburetor by heat from the engine exhaust, and means for varying the amount of air admitted through the air intake responsive to the amount of fuel atomized by the fuel carburetor.

14. An internal combustion engine having a fuel carburetor, means conducting the fuel atomized thereby to the engine cylinders, an air intake through which air may pass to the cylinders without passing through the fuel carburetor, and means dependent upon the amount of fuel atomized in the carburetor for varying the amount of air admitted through the said air intake.

15. An internal combustion engine having a fuel carburetor, means conducting the fuel mixed with some air thereby, to the engine cylinders, an air intake through which air may pass to the cylinders without passing through the carburetor, and means dependent upon the amount of fuel leaving the carburetor for varying the amount of air admitted through the said air intake but lagging behind in increasing the amount of air introduced as the amount of fuel vaporized is increased.

16. An internal combustion engine having a plurality of cylinders, an air intake manifold, a fuel vaporizer, a fuel intake manifold, said fuel intake manifold having a cross section substantially less than that of the air intake manifold whereby the velocity of the ingoing vaporized fuel is relatively increased, and means dependent upon the amount of fuel vaporized for varying the amount of air admitted through the said air intake but lagging behind in increasing the amount of air introduced as the amount of fuel vaporized is increased.

17. An internal combustion engine having a fuel vaporizer, means conducting the vaporized fuel therefrom to the engine cylinders, an air intake and means for conducting the major portion of the air to be burned with said fuel from said intake and substantially to the engine cylinders before being mixed with the vaporized fuel, means whereby the vaporized fuel is heated by the engine exhaust and means dependent upon the amount of fuel vaporized for varying the amount of air admitted through the said air intake but lagging behind in increasing the amount of air introduced as the amount of fuel vaporized is increased.

18. An internal combustion engine having a plurality of cylinders, a fuel vaporizer, an air intake, and air intake manifold conducting air from the air intake to the cylinders, a fuel vaporizer, and a fuel intake manifold for conducting vaporized fuel from the fuel vaporizer to the engine cylinders, said fuel intake manifold having ports leading into the air intake manifold adjacent the ports from the air intake manifold to the cylinders and the air intake manifold being relatively large in cross section as compared with the fuel intake manifold whereby most of the air is admitted through the air intake, and the fuel intake manifold being in the form of a closed loop heated by the engine exhaust, said fuel manifold ports being on one side of said loop and said loop having a passage on the opposite side leading to the fuel vaporizer.

19. The method of operating an internal combustion engine which consists in atomizing the fuel with some air and causing same to be drawn into the engine cylinders by the operation of the engine, admitting and admixing a relatively large amount of air with the atomized fuel just before it enters the cylinders and varying the amount of air so admitted and admixed responsive to variations in the amount of fuel being supplied to the cylinders.

20. The method of operating an internal combustion engine which consists in atomizing the fuel with some air and causing same to be drawn into the engine cylinders by the operation of the engine, heating the atomized fuel before it enters the cylinders, admitting and admixing a relatively large amount of air with the atomized and heated fuel just before it enters the cylinders and varying the amount of air so admitted and admixed responsive to variations in the amount of fuel being supplied to the cylinders.

In testimony whereof I have signed my name to this specification.

JOHN W. JEPSON.